United States Patent
Wieschemann et al.

(10) Patent No.: US 11,269,359 B2
(45) Date of Patent: Mar. 8, 2022

(54) METHOD AND SYSTEM FOR OPERATING AN AUTOMATICALLY GUIDED TRANSPORT VEHICLE FOR CONTAINERS

(71) Applicant: Konecranes Global Corporation, Hyvinkää (FI)

(72) Inventors: Armin Wieschemann, Oberhausen (DE); Stefan Aldejohann, Langenfeld (DE); Heiko Schulz, Leverkusen (DE); Jan Philipp Schmidt-Ewig, Essen (DE); Heinz-Christoph Eichner, Ratingen (DE); Mohammad Ahmadian, Neuss (DE)

(73) Assignee: Konecranes Global Corporation, Hyvinkää (FI)

( * ) Notice: Subject to any disclaimer, the term of this patent is extended or adjusted under 35 U.S.C. 154(b) by 106 days.

(21) Appl. No.: 16/611,079

(22) PCT Filed: Apr. 25, 2018

(86) PCT No.: PCT/EP2018/060516
§ 371 (c)(1),
(2) Date: Nov. 5, 2019

(87) PCT Pub. No.: WO2018/202483
PCT Pub. Date: Nov. 8, 2018

(65) Prior Publication Data
US 2020/0150686 A1    May 14, 2020

(30) Foreign Application Priority Data
May 5, 2017  (DE) .......................... 102017109731.7

(51) Int. Cl.
*G05D 1/02* (2020.01)

(52) U.S. Cl.
CPC ... *G05D 1/0291* (2013.01); *G05D 2201/0213* (2013.01)

(58) Field of Classification Search
CPC .... G05D 1/0291; G05D 1/0088; G05D 1/021; G05D 1/0212; G05D 1/0225;
(Continued)

(56) References Cited

U.S. PATENT DOCUMENTS

| 8,825,263 B1 | 9/2014 | Nelson, Jr. | |
| 2008/0106062 A1* | 5/2008 | Flournoy | E21F 13/004 280/420 |

(Continued)

FOREIGN PATENT DOCUMENTS

| DE | 102004009187 | 9/2005 |
| DE | 102012108768 | 3/2014 |

(Continued)

OTHER PUBLICATIONS

International Search Report and Written Opinion of the International Searching Authority from corresponding Patent Cooperation Treaty (PCT) Application No. PCT/EP2018/060516, dated Jul. 23, 2018.

(Continued)

*Primary Examiner* — Aaron L Troost
(74) *Attorney, Agent, or Firm* — Gardner Linn

(57) ABSTRACT

A method and system are provided for operating an automatically guided container transport vehicle that can be automatically guided during forward driving and during rearward driving. The transport vehicle includes a towing vehicle and a trailer with a loading surface for at least one container. The transport vehicle has a vehicle control system for controlling a steering system and a travel drive of the transport vehicle in such a way that the transport vehicle follows a nominal route. The nominal route is automatically (Continued)

pre-defined taking into account a trajectory of the transport vehicle.

9 Claims, 4 Drawing Sheets

(58) Field of Classification Search
CPC ... G05D 2201/0213; G05D 2201/0216; G05D 1/00–12; G01C 21/34; G01C 21/3407
See application file for complete search history.

(56) References Cited

U.S. PATENT DOCUMENTS

| | | | | |
|---|---|---|---|---|
| 2013/0054133 | A1* | 2/2013 | Lewis | G01S 19/13 701/423 |
| 2014/0277675 | A1 | 9/2014 | Anderson et al. | |
| 2018/0052463 | A1* | 2/2018 | Mays | B60W 50/02 |
| 2018/0127027 | A1* | 5/2018 | Brennan | B62D 15/028 |

FOREIGN PATENT DOCUMENTS

| | | | |
|---|---|---|---|
| DE | 102014114812 | 4/2016 | |
| DE | 102015217555 | 3/2017 | |
| WO | WO-2016005336 A2 * | 1/2016 | B60P 1/649 |
| WO | 2016168650 | 10/2016 | |

OTHER PUBLICATIONS

International Preliminary Examination Report from corresponding Patent Cooperation Treaty (PCT) Application No. PCT/EP2018/060516, dated Jul. 17, 2019.

English translation of the International Preliminary Examination Report from corresponding Patent Cooperation Treaty (PCT) Application No. PCT/EP2018/060516, dated Jul. 17, 2019.

* cited by examiner

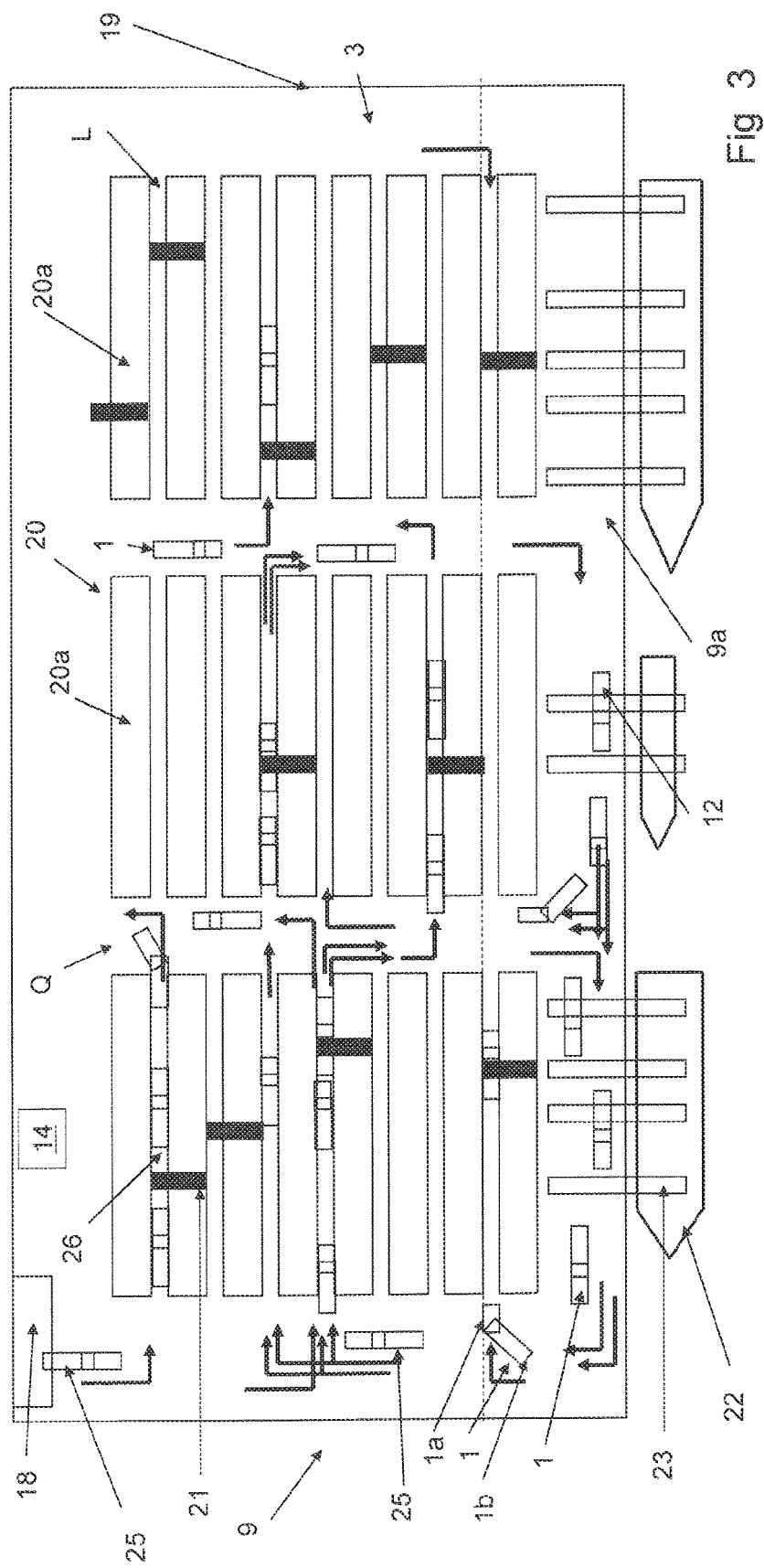

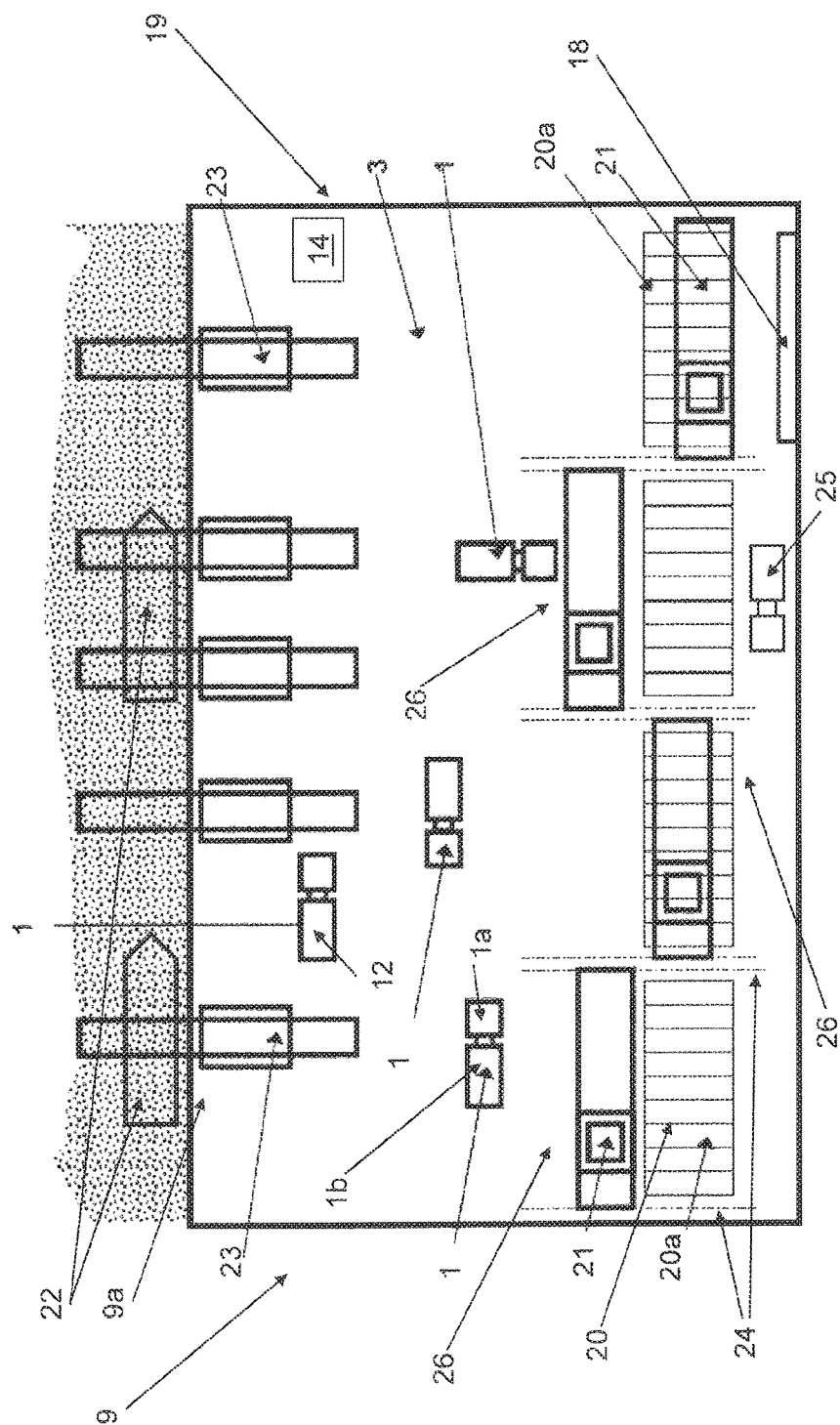

METHOD AND SYSTEM FOR OPERATING AN AUTOMATICALLY GUIDED TRANSPORT VEHICLE FOR CONTAINERS

CROSS REFERENCE TO RELATED APPLICATIONS

The present application is a § 371 national stage of International Application PCT/EP2018/060516, filed Apr. 25, 2018, which claims priority benefit of German Pat. Application DE 10 2017 109 731.7, filed May 5, 2017.

FIELD OF THE INVENTION

The invention relates to a method for operating an automated guided transport vehicle for containers, and to a system for operating an automated guided transport vehicle for containers.

BACKGROUND

Transport vehicles for containers are known from DE 10 2012 108 768 A1, for example. Such transport vehicles include a towing vehicle and a trailer that together form an articulated combination. The trailer includes a loading surface for at least one container. The loading surface is delimited on its sides typically by guide elements. The guide elements are also referred to as position adapters. Such a combination can in particular also be formed as a trailer truck.

Such transport vehicles are typically used only internally within terminals for handling containers, in particular ISO containers, but not on public roads. Accordingly, such transport vehicles are internal transport vehicles that are also referred to as terminal trucks or terminal tractors. Containers are transported between handling devices of the terminal by means of the transport vehicles in so-called horizontal traffic. The handling devices can be container bridges or gantry cranes, for example. In the case of a terminal formed as a port terminal, containers are handled between a ship and an associated transport vehicle by means of the container bridges. The gantry cranes are used to place containers into, or remove containers from, a store of the container terminal and pick up or place the containers from/onto the loading surface of an associated transport vehicle. In the store, the containers are intermediately stored before they are transported away by means of ships or on public roads by means of lorries or on the railway network by means of freight trains.

The aforementioned internal transport vehicles can be guided manually and can be actively manually controlled accordingly, in particular during acceleration, braking and steering by drivers typically also travelling in the vehicles. For this purpose, manually guided transport vehicles have a corresponding vehicle controller and typically also a driver's cab, from which manual engagement of the vehicle controller can be effected for the purpose of manual guiding. Alternatively, the internal transport vehicles can also be automatically guided and can be controlled in an automated manner accordingly, in particular during acceleration, braking and steering, as so-called automated guided vehicles (AGV). For this purpose, automated guided transport vehicles have a suitable vehicle controller and so, by reason of the automatic control or navigation effected thereby, it is not necessary or possible for a driver also travelling in the vehicle to perform any active manual engagement. In this sense, an automated guided transport vehicle can also be manned if a driver also travels in the vehicle, but in this case not in the sense of having to or being able to actively engage the controller of the transport vehicle as a vehicle driver. Transport vehicles that are driverless but are manually remote-controlled by a vehicle driver are not deemed to be automated guided vehicles but instead are deemed to be manually guided vehicles.

A manually guided combination consisting of a towing vehicle and a trailer is also known from German laid-open document DE 10 2004 009 187 A1. Only in the special case of rearward travel can an automatic assistance function be used for the purpose of receiving a chassis frame.

German laid-open document DE 10 2015 217 555 A1 discloses a combination consisting of a passenger car and a trailer. In terms of a manual operating mode, a reference trajectory is compared with a desired trajectory in order to support the driver in driving manoeuvres.

DE 10 2014 114 812 A1 describes, with reference to a combination having a towing vehicle and a trailer coupled thereto, which combination is manually controlled by a driver, a device for determining an articulation angle between the towing vehicle and the trailer.

WO 2016/168650 A1 describes a system and a method for guiding an articulated vehicle having at least one first section and one second section. The system includes one or more sensors for detecting the positions of the towing vehicle and the trailer and the angle between the towing vehicle and trailer, and a computer system that includes an algorithm for determining the position and orientation of the vehicle and an algorithm for determining guide commands.

U.S. Pat. No. 8,825,263 B1 discloses a method for guiding a leading vehicle part using a desired path for a trailing vehicle part. The path for the leading vehicle part is determined using an algorithm in consideration of the data from the trailing vehicle part, navigation data and vehicle dimensions. The disclosed determined desired route of the trailing vehicle part is relative to the function (e.g., seeding over a wide area).

US 2014/277675 A1 discloses a method and a device for controlling machine configurations. A desired trajectory is determined based on the steering of the host machine, a desired working path or an alignment of the host machine and the auxiliary machine.

SUMMARY OF THE INVENTION

The present invention provides a method and a system for operating an automated guided transport vehicle for containers that both permit particularly safe automated operation of the transport vehicle. In accordance with an aspect of the invention, a method for operating automated guided transport vehicles for containers, which are each guided in an automated manner during forwards travel and also during rearwards travel and which include a towing vehicle and a trailer having a loading surface for at least one container, wherein the respective transport vehicle, in particular the towing vehicle, includes a vehicle controller in order to actuate, in an automated manner, a steering mechanism and a travel drive of the transport vehicle such that the transport vehicle follows a desired route, is improved by virtue of the fact that the desired route is specified in consideration of a trajectory of the respective transport vehicle, wherein different trajectories are determined and different desired routes are specified for different transport vehicles. Optionally, each desired route is specified in an automated manner in this way. The specified desired route may be transmitted to the vehicle controller via a wireless communication connection and from there is converted in an automated manner into corresponding driving manoeuvres by suitably actuating the steering mechanism and the travel drive in order to follow the desired route. Optionally, the transport vehicle is formed as a trailer truck having a terminal truck as a towing vehicle, and so the trailer is formed as a semi-trailer.

An automated guided transport vehicle is understood in terms of this invention to mean a transport vehicle that can be operated in a fully automated manner and that is controlled or guided in an automated manner, i.e. not manually by a driver, during forwards travel and also during rearwards travel. In particular, such automated guided transport vehicles can perform all driving manoeuvres in an automated manner and not just individual driving manoeuvres such as reverse parking procedures, travelling through narrow passages or the like.

"Trajectory" is understood to mean the movement path of the transport vehicle, also referred to as a motion path, or the movement path of a vehicle-fixed point defined on the transport vehicle during a driving manoeuvre. The vehicle manoeuvre can include in particular one or more elements of travel in a straight line and/or one or more elements of travel with turning movements with different turning radii. A component of each trajectory is thus a sequence of different positional points of the transport vehicle during a particular driving manoeuvre. The respective trajectory of a transport vehicle is in particular dependent upon the vehicle kinematics, i.e. kinematic boundary conditions of the respective transport vehicle, and thus upon geometric ratios such as length, width and in particular the articulation angle of the transport vehicle or the articulated combination consisting of the towing vehicle and trailer. The articulation angle is produced when a steering angle is not equal to zero and is thus dependent on the steering angle. The trajectories are thus determined and considered on the basis of, and thus in consideration of, the kinematic boundary conditions of the respective transport vehicle.

In an advantageous manner, provision is made that the trajectories are considered in consideration of the kinematic boundary conditions of the transport vehicle, in particular the articulated combination consisting of the towing vehicle and the trailer of the transport vehicle. As a result, particularly precise and thus safe automated guidance of the transport vehicle is possible.

In accordance with the invention, provision is also made that different trajectories are determined and different desired routes are specified for different transport vehicles. As a result, the precision of the automated guidance of the transport vehicles is further increased because the kinematic boundary conditions that are specific to different transport vehicles, in particular owing to articulation angles between the towing vehicle and the trailer, are considered when specifying the desired route.

Provision is further made that the specified desired route is compared with actual values of a position and orientation or alignment of the transport vehicle, in particular within the operating area of a terminal for handling containers, and a deviation of the actual values from the desired route is reduced by actuating the steering mechanism and/or travel drive accordingly. In this context, a decision is made from the actual values of the position and alignment of the transport vehicle and the comparison with the desired route as to whether and how the vehicle controller has to actively engage the steering mechanism and/or the travel drive in order to approximate the desired route.

In an advantageous manner, provision is made that the position and alignment of the transport vehicle are determined in consideration of the articulation angle between the towing vehicle and the trailer. The position of the towing vehicle can be determined, as described in more detail hereinunder, by means of known methods, for example transponder navigation. On the basis thereof, the position and alignment of the entire transport vehicle including the trailer can then be determined using the determined articulation angle and using known dimensions of the towing vehicle and trailer. For this purpose, a suitable sensor for determining an actual value of the articulation angle is provided on the towing vehicle. Determining an actual value of the articulation angle can also include determining the steering angle of the towing vehicle and the rotational speed of the wheels of an axle of the trailer, each via a sensor.

According to an advantageous embodiment of the method, provision can additionally be made that a steering angle is adjusted, by means of the steering mechanism, in dependence upon an actual value of an articulation angle between the towing vehicle and the trailer. In this manner, the deviation of the actual values of the position and alignment from the desired route can be reduced and thus the actual values can approximate the desired values.

In accordance with the invention, a system for operating automated guided transport vehicles for containers, including a management system and transport vehicles for containers, which can each be guided in an automated manner during forwards travel and also during rearwards travel and which include a towing vehicle and a trailer having a loading surface for at least one container, wherein the respective transport vehicle, in particular the towing vehicle, includes a vehicle controller in order to actuate, in an automated manner, a steering mechanism and a travel drive of the transport vehicle such that the transport vehicle follows a desired route, is improved by virtue of the fact that the management system is configured and designed to specify the desired route, such as in an automated manner, in consideration of a trajectory of the respective transport vehicle and to transmit same to the vehicle controller, wherein different trajectories are determined and different desired routes are specified for different transport vehicles. The management system is computer-assisted for this purpose and accordingly includes a navigation computer having a computing unit including a memory unit. Therefore, the advantages mentioned in relation to the method in accordance with the invention can also be achieved by the system in accordance with the invention, such as precise and safe automated guidance of one or more transport vehicles along the respective desired route.

In an advantageous manner, provision is made that the system, in particular the management system and the vehicle controller, is configured and designed to implement a method as claimed in any one of the preceding claims.

According to an advantageous use of a method and/or system in accordance with the invention for a transport vehicle, provision is made that the loading surface thereof is delimited by guide elements for guiding and aligning a container to be placed on the loading surface.

These and other objects, advantages and features of the invention will become apparent upon review of the following specification in conjunction with the drawings.

BRIEF DESCRIPTION OF THE DRAWINGS

Possible exemplified embodiments of the invention will be explained with reference to the following description. In the figures:

FIG. 3 shows a schematic view of a terminal for handling containers with transport vehicles for containers of FIG. 1; and FIG. 4 shows a schematic view of an alternative terminal for handling containers with transport vehicles for containers of FIG. 1.

DESCRIPTION OF THE PREFERRED EMBODIMENTS

Figure 1:
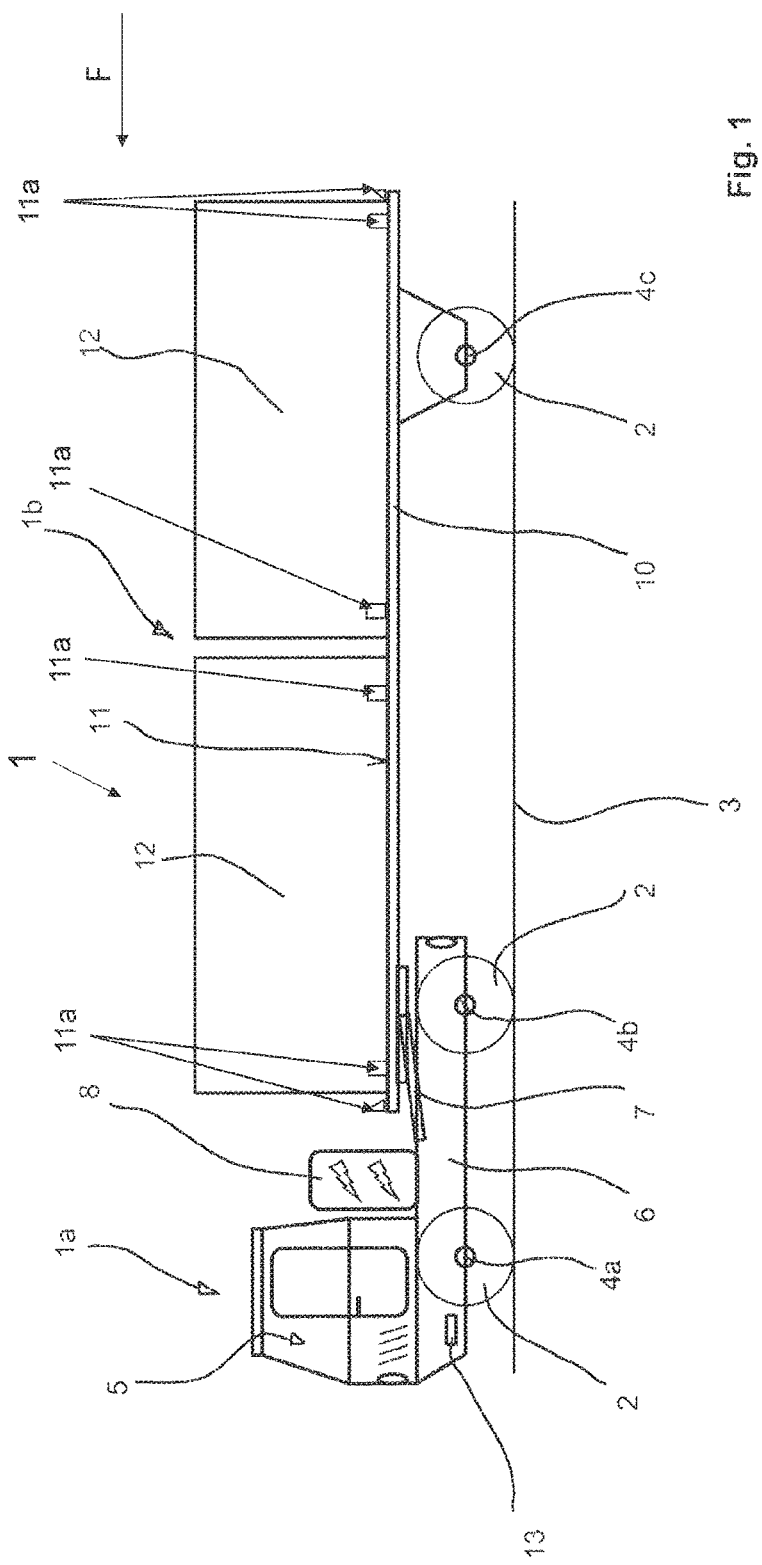
FIG. 1 shows a schematic side view of a transport vehicle for containers.

FIG. 1 shows a schematic side view of an automated guided transport vehicle 1 for containers 12, which is used in a terminal 9 for handling containers 12 (see FIGS. 3 and 4). The transport vehicle 1 is configured by way of example as a trailer truck and accordingly includes a towing vehicle 1a, also referred to as a terminal truck, and a trailer 1b in the form of a semi-trailer that is coupled thereto in an articulated manner Such trailer trucks may have a total truck weight of up to 200 t in the heavy-duty version.

The transport vehicle 1 can travel freely on a ground surface 3 by means of wheels 2 and can therefore travel in a floor-bound but not rail-bound manner. Accordingly, the transport vehicle 1 is to be distinguished from rail vehicles. The wheels 2 are each provided with a tyre arrangement that may be an air-filled rubber tyre arrangement in the sense of tyres. Moreover, the transport vehicle 1 includes a travel drive having at least one motor configured as an electric motor and a transmission in order to drive the wheels 2 thereby. The motor and the transmission are not illustrated for reasons of improved clarity. Instead of an electric motor, an internal combustion engine is basically also feasible. The wheels 2 are typically arranged on two axles 4a, 4b in the region of the towing vehicle 1a. If the transport vehicle 1 is configured as a trailer truck, wheels 2 are also arranged on at least one further third axle 4c of the trailer 1b configured as a semi-trailer. It will be appreciated that it is also possible to provide other numbers of axles and axle arrangements with a corresponding number of wheels 2 if required from a technical point of view.

Figure 2:
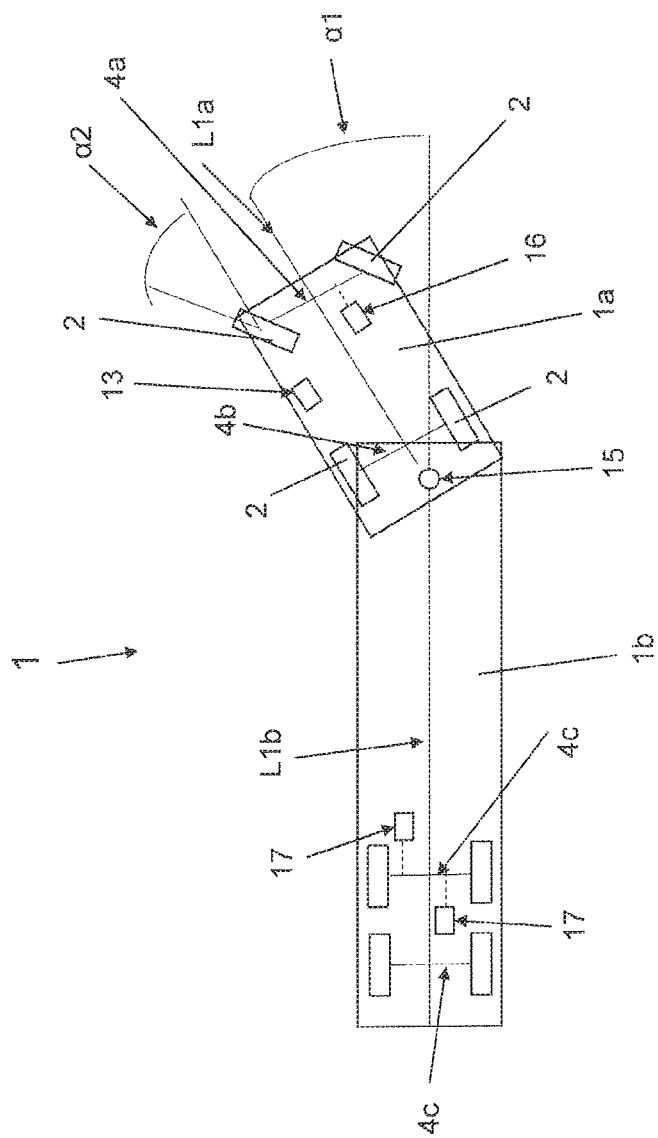
FIG. 2 shows a schematic plan view of the transport vehicle of FIG. 1 during travel with turning movements.

The transport vehicle 1 or its towing vehicle 1a includes a chassis 6, on which the wheels 2 are mounted via the front first axle 4a and the rear second axle 4b. At least some of the wheels 2 mounted on the towing vehicle 1a, such as the wheels 2 mounted on the front axle 4a, are steerable in order to allow the transport vehicle 1 to travel with turning movements. This is schematically illustrated in FIG. 2, which shows a schematic plan view of the transport vehicle 1 during travel with turning movements. During the travel with turning movements, a non-zero articulation angle $\alpha 1$ is produced between the longitudinal axis L1a of the towing vehicle 1a and the longitudinal axis L1b of the trailer. The articulation angle $\alpha 1$ is thus defined as the angle by which the longitudinal axis L1a of the towing vehicle 1a deviates from the longitudinal axis L1b of the trailer 1b when the transport vehicle 1 is travelling with turning movements. A steering angle $\alpha 2$ of the wheels 2 can be changed with respect to the longitudinal axis L1a of the towing vehicle 1 via a steering mechanism of the towing vehicle 1a in order to change the articulation angle $\alpha 1$. In the case of travel in a straight line, the articulation angle $\alpha 1$ and also the steering angle $\alpha 2$ are equal to zero. In order to be able to determine an actual value of the articulation angle $\alpha 1$, the towing vehicle 1a includes a suitable sensor 15 known per se. The articulation angle $\alpha 1$ can also be calculated in a manner known per se from measurement signals from a sensor 16 for determining the steering angle $\alpha 2$ and sensors 17 for determining rotational speeds of the opposite wheels 2 of the axle 4c of the trailer 1b. As can be seen in FIG. 2, the trailer 1b can also have more than one axle 4c, in a deviation from the illustration in FIG. 1. A computing unit having a memory unit can also be provided for determining or calculating the articulation angle $\alpha 1$. The computing unit can be part of the vehicle controller 13.

Moreover, a fifth wheel plate 7, which is part of a fifth wheel coupling, is arranged in the rear region of the chassis 6, as shown in FIG. 1. The fifth wheel plate 7 can be configured to be able to be lifted and lowered via a hydraulic drive and so the towing vehicle 1a can couple and uncouple the trailer 1b actively and independently. The hydraulic lift of the fifth wheel plate 7 renders it possible to raise fifth wheel loads up to 45 t, for example. A different way of coupling and uncoupling the trailer 1b without a hydraulic lifting option is also feasible, such as by means of a coupling mechanism that can be manually actuated. The fifth wheel plate 7 can also be configured in an articulated manner such that the towing vehicle 1a and trailer 1b are not routinely separated and therefore the towing vehicle 1a and trailer 1b are permanently connected as a fixed unit in the form of a trailer truck. Moreover, the chassis 6 supports a battery 8 that powers the electric motor(s) of the travel drive of the transport vehicle 1 and is simultaneously moved therewith. The battery 8 may be designed as a rechargeable lithium-ion battery or as a lead battery and is arranged above the chassis 6 or below same, such as between the two axles 4a, 4b in order to permit simple replacement with a charged battery 8. Alternatively, an additional battery 8 for powering the travel drive can also be arranged on the trailer 1b and can be electrically connected to the travel drive for this purpose.

The trailer 1b configured as a semi-trailer has no front axle arranged at the end facing towards the towing vehicle 1a but instead has only one or a plurality of rear axles 4c that are mounted at the end facing away from the towing vehicle 1a under a frame 10 of the trailer 1b. However, a type of front axle of the trailer 1b is formed by the rear axle 4b of the towing vehicle 1a. The trailer 1b also has supports, not illustrated, which are arranged at its front end facing towards the towing vehicle 1a. The supports are provided for placing the trailer 1b down after uncoupling has been effected and, depending upon the configuration of the fifth wheel plate 7, for hitching and unhitching a trailer 1b configured as a semi-trailer onto and from the towing vehicle 1a. Moreover, the trailer 1b does not have a dedicated drive.

Furthermore, the transport vehicle 1 or its trailer 1b has, on its frame 10, a substantially flat loading surface 11 for containers 12. In FIG. 1, two containers 12 that are configured as ISO containers and are about 20 feet in length are placed down on the loading surface 11 one behind the other as seen in the direction of travel F of the transport vehicle 1 during forwards travel. ISO containers in the above-defined sense have normed corner fittings. The corner fittings can be grasped such as by the load picking-up means or mechanism of a crane configured as a so-called spreader frame, in order to raise the ISO container from the loading surface 11 or place it down on this surface.

In order to be able to guide a container 12 to be transported, and in the case of ISO containers in particular the corner fittings thereof, as it is being set down on the loading surface 11 and to orientate it in relation to the loading surface 11, the loading surface 11 is delimited at its sides by a plurality of guide elements 11a. For this purpose, the guide elements 11a have guide surfaces that extend in an inclined manner. In this case, the guide surfaces extend upwards and outwards away from the loading surface 11 and extend downwards and inwards towards the loading surface 11. The guide elements 11a may be arranged in pairs on opposing sides, in particular long sides and/or narrow sides, of the loading surface 11. The guide surfaces of a pair of guide elements 11a form a type of funnel, the inclined extension of which tapers towards the loading surface 11 in order to achieve the guiding and aligning function. Accordingly, the guide surfaces of a pair of guide elements 11a widen in the upwards direction away from the loading surface 11.

The transport vehicle 1 is guided in an automated manner in the above-defined sense and for this purpose has a vehicle controller 13 that is schematically illustrated in FIG. 1 and is used as a navigation system. Furthermore, the transport vehicle 1 can be guided or controlled optionally by a driver also in the above-defined sense manually within the respective terminal 9 and so it is also feasible to alternate between manual and automated guidance of the transport vehicle 1. For the manual variant, a driver's cab 5 including corresponding controller or control means for manually engaging the vehicle controller 13 is arranged in the front region of the towing vehicle 1a. In the case of transport vehicles 1 guided exclusively in an automated manner, the driver's cab 5 can remain driverless, as illustrated in FIG. 1, or can even be omitted.

FIG. 3 shows a schematic view of a terminal 9 for handling containers 12, in which transport vehicles 1 as per FIG. 1 are used, in a plan view. The terminal 9 is designed by way of example as a port terminal. In this case, a plurality of ships 22 can dock at a quay 9a of a port in order to deliver or collect containers 12. In order to load or unload the ships 22, the quay 9a is provided with container bridges 23 that are also referred to as ship-to-shore cranes—or STS crane for short—and of which the jibs extend, on the one hand, over the ships 22 and, on the other hand, over the quay 9a. Alternatively, the loading or unloading of the ships 22 can also be performed using so-called wharf cranes, of which the jib is pivoted in this case over the corresponding ship 22 about a vertical axis.

The terminal 9 is typically surrounded by a boundary 19 formed e.g. as a fence or wall in terms of a delimited operating area and is separated thereby from its outer surrounding area and thus from public road traffic outside the terminal 9 and external transport vehicles 25 or conventional lorries travelling therein. The terminal 9 can be reached by external transport vehicles 25, for collecting or delivering containers 12, only via passing areas 18. In order to open and close each passing area 18 in a targeted or controlled manner, it is also possible to provide in each case a security checkpoint for registering arrival and departure, including identification of the arriving and departing external vehicles and their drivers.

Moreover, the terminal 9 includes, within the boundary 19, a container store 20 in which containers 12 can be stacked for short-term intermediate storage in at least one storage area 20a that is also defined as a stack. This can be the case after the containers 12 have been unloaded from the ships 22 and before they are loaded for further transportation outside the terminal 9 onto a road vehicle or transport vehicle 25 or rail vehicle or after they have been delivered thereby and before they are loaded onto the ships 22. The internal transport vehicles 1 that are not designed or authorised for public roads travel over the ground surface 3 encompassing the quay 9a of the port in order to transport the containers 12, e.g. configured as ISO containers, between the container bridges 23 and the gantry cranes 21, used as container stacking cranes, of the container store 20 of the terminal 9.

Typically, the container store 20 in such a terminal 9 includes a plurality of storage areas 20a that are arranged next to one another and spaced apart from one another in rows or in a grid pattern. In each storage area 20a, a plurality of rows of containers 12 can be placed down with their long sides next to one another and for each row a plurality of containers 12 can be placed down one on top of another. In order to manage the container store 20 or the respective storage areas 20a, i.e. for placing the containers 12 into the store/storage area or removing containers 12 therefrom, at least one corresponding gantry crane 21 is provided for each storage area 20a of the container store 20 in order to pick up containers 12 from, or release containers 12 to, the transport vehicles 1 or 25 for placing the containers into, or removing the containers from, the container store 20. Typically, a plurality of storage areas 20a are provided in such a terminal 9 and are each managed for the placement/removal of containers 12 into/from the storage areas by at least one stacking crane configured as a gantry crane 21. The gantry cranes 21 representing the handling devices span, with their crane girders supported by gantry supports, the corresponding storage area 20a and the containers 12 stacked therein. For placing and removing containers 12 into/out of storage, the gantry cranes 21 can move over the storage area 20a in the longitudinal direction of the gantry crane 21.

In order to transport containers 12, common and simultaneous operation of at least one transport vehicle 1, which in terms of the above definition is an internal and preferably automated guided vehicle, and at least one manually guided external transport vehicle 25, which can be for example a conventional lorry or trailer truck authorised for public roads, occurs within the terminal 9. Transport vehicles 1 in the manual variant of the transport vehicle 1 described in FIG. 1 with a driver's cab 5 can also travel within the terminal 9 in addition to or as an alternative to the automated guided variant. The internal transport vehicles 1 transport the containers 12 between the container store 20 or the handling devices thereof and the handling devices located at the quay 9a in the form of the container bridges 23 or wharf cranes or wharf mobile cranes, with which the containers 12 can be handled between the transport vehicles 1 and the ships 22 and the transport vehicles 1 can be loaded and unloaded accordingly at the quay 9a. The external transport vehicles 25 can collect containers 12 from the container store 20 or the handling device thereof for further transportation on public roads or, after transportation on public roads, can deliver the containers for intermediate storage in the container store 20. This transport is effected in each case in so-called horizontal traffic.

The gantry cranes 21 allocated to the storage areas 20a as handling devices are configured in FIG. 3 as so-called rubber-tyred stacking cranes (or rubber-tyred gantry cranes—RTG for short) or rail-bound stacking cranes (or rail-mounted gantry cranes—RMG for short), which are either guided or controlled manually by an operator also travelling in a crane cab or are guided or controlled in a (semi-)automated manner. Accordingly, the terminal 9 schematically illustrated in FIG. 3 is also referred to as an RMG or RTG terminal. In this type of terminal, aisles L, Q having one or more lanes and arranged in a straight line or in a grid pattern are provided between the storage areas 20a extending in parallel with the edge of the quay 9a running alongside them, in which aisles the external transport vehicles 25 entering and exiting the terminal 9 via the passing area 18 and the internal transport vehicles 1 can travel. The transport vehicles 1, 25 are loaded and unloaded by the gantry crane 21 in the longitudinal aisles L of the storage areas 20a running along the long sides. At this location, lanes, serving as transfer lanes or transfer area 26, for the transport vehicles 1, 25 are provided, which are likewise spanned by the respective gantry crane 21. The bent arrows shown in FIG. 3 indicate that the transport vehicles 1, 25 can enter and then leave the longitudinal aisles L and the transfer lanes at that location via transverse aisles Q, or the lanes thereof, extending transversely and in particular perpendicularly to the quay 9a. Provision can also be made that the gantry cranes 21 manage a plurality of storage areas 20a, which are adjacent one another in the longitudinal direction and are spaced apart from one another by a transverse aisle Q, and for this purpose travel over one or a plurality of transverse aisles Q. Alternatively, each storage area 20a is allocated at least one gantry crane 21. However, the region of the quay 9a including the handling devices at that location is reserved for the internal transport vehicles 1, for which reason corresponding barriers or passing areas with security checkpoints can be provided within the terminal 9. This is indicated by the dashed line in FIG. 3.

FIG. 4 illustrates an alternative terminal 9 that is configured as a so-called ASC terminal. In contrast to the terminal 9 illustrated in FIG. 3, the gantry cranes 21 of the container store 20 in this case are configured as so-called automated and rail-bound stacking cranes, which are also referred to as automated stacking cranes—ASC for short. In this type of terminal, only narrow aisles are provided between the storage areas 20a as travel paths 24 for the ASCs. The travel paths 24 for the ASCs include rails on which the respective ASCs move and a storage area 20a is arranged between each pair of rails. These aisles are not provided for passage of the transport vehicles 1 and 25 and are generally too narrow for such passage. In contrast to the RMG or RTG terminals, the storage areas 20a also do not extend along and in particular in parallel with the quay 9a but instead typically extend transversely and in particular perpendicularly to the quay. The gantry cranes 21 accordingly also move transversely to the quay 9a. Furthermore, the container store 20 of the ASC terminal does not have any transfer lanes or transfer areas 26 arranged on the long sides of the storage areas 20a. Instead, head-side transfer areas 26 are provided on the longitudinal ends of the respective storage area 20a that point in the longitudinal direction. Such an ASC terminal includes a handling area that is on the water-side or quay-side relative to the container store 20 and is separated from land-side traffic of external transport vehicles 25 in the land-side handling area by the previously described configuration of the ASC terminal and the container store 20 during regular operation of the terminal 9. Only in special cases, such as for maintenance or repair purposes, can vehicles travel between the water-side handling area and the land-side handling area, for which purpose sufficiently wide aisles can then be used. In order to enter or exit the land-side handling area, the transport vehicles 25 use a passing area 18 in the above sense.

Accordingly, only internal automated and/or manually guided transport vehicles 1 travel in the water-side handling area. This area can thus be a delimited, purely automated area. In the land-side handling area, it is also possible for internal, manually guided transport vehicles 1 to be used in mixed traffic with external, manually guided transport vehicles 25 in order to ensure, for example, a connection of a rail terminal within the terminal 9.

However, the internal transport vehicles 1 are not allowed to drive through the respective passing area 18 in any of the previously described terminals 9 because they are not allowed to travel on public roads outside the terminal 9 and also can be operated according to regulations only within the terminal 9. This does not include the vehicles leaving the water-side handling area and leaving the land-side handling area or the terminal 9, such as for maintenance or repair purposes, which is not deemed to be an operation according to regulations.

In order to coordinate the traffic within the respective terminal 9 of FIG. 3 or of FIG. 4, a computer-assisted management system 14 is provided, via which transport orders for the internal transport vehicles 1 are planned, managed and used for route planning and route monitoring. The warehousing or management of the container store 20 can also be performed by the management system 14 or the navigation computer thereof and can influence the scheduling of the transport orders or routes. The routes that are to be travelled for completing transport orders are generated in the sense of desired routes by means of the management system 14 and are transmitted to the transport vehicles 1 or their vehicle controller 13 via wireless communication connections, such as in the form of WLAN connections. The desired routes can consist of a plurality of individual sections each having a start point and a target point. In order to coordinate the traffic or route planning and route monitoring, the management system 14 may also perform continuous processing of the time-variable positions and alignments of the transport vehicles 1, which are located in the terminal 9, and further operating information such as, for example, the respectively used travel areas, lanes and travel directions of the transport vehicles 1 and driving speeds and traffic regulations. Desired routes can also be specified and changed in this case via the management system 14 and the communication connections, such as by means of target positions specified for specific points in time, lanes to be used and/or travel directions. Moreover, the management system 14 can block or release dynamic areas, in particular individual lanes, in terms of exclusion areas, and can thus ensure that only one transport vehicle 1 is located in a specified area.

By means of the vehicle controller 13, the driving manoeuvres, which are possible in forwards travel or rearwards travel, of the automated guided transport vehicles 1, can be controlled in an automated manner in that the desired routes that are transmitted, and thus specified, by the management system 14 are converted by control technology into corresponding driving manoeuvres in particular on specified lanes within the terminal 9. Converting into driving manoeuvres includes the necessary travel specifications in the form of desired values for actuating the travel drive and/or the steering mechanism of the respective transport vehicle 1. In this regard, the vehicle controller 13 is used to thus control, in an automated manner, steering operations and speeds and accelerations and decelerations, optionally by way of a braking operation, of the transport vehicle 1.

The desired routes or individual sections thereof are specified by the management system 14 such as in an automated manner, wherein at least one previously determined trajectory of the respective transport vehicle 1 during a driving manoeuvre is also considered. "Trajectory" is understood to mean the movement path of the transport vehicle 1, also referred to as a motion path, or the movement path of a vehicle-fixed point defined on the transport vehicle 1 during a driving manoeuvre. The vehicle manoeuvre can include in particular one or more elements of travel in a straight line and/or one or more elements of travel with turning movements with different turning radii. A component of each trajectory is thus a sequence of different positional points of the transport vehicle 1 during a particular driving manoeuvre. The respective trajectory of a transport vehicle 1 is in particular dependent upon the vehicle kinematics, i.e. kinematic boundary conditions of the respective transport vehicle 1, and thus geometric ratios such as length, width and in particular the articulation angle $\alpha 1$ of the transport vehicle 1 or the articulated combination consisting of the towing vehicle 1a and trailer 1b. The articulation angle $\alpha 1$ is produced when a steering angle $\alpha 2$ is not equal to zero and is thus dependent on the steering angle $\alpha 2$. The trajectories are thus determined and considered on the basis of, and thus in consideration of, the kinematic boundary conditions of the respective transport vehicle 1.

The trajectories can be determined in particular for different driving manoeuvres with possible elements of travel with turning movements with different radii of curvature and speeds and accordingly different steering angles $\alpha 2$ and associated steering locking of the steering mechanism, but can also be determined with elements of travel in a straight line. The determination of the trajectories can be based, for example, on an envelope curve analysis. Likewise, the influence of other boundary conditions such as the transported load or the load to be transported on the respective trajectory can be considered for corresponding driving manoeuvres. The load, or at least the presence of a load, can be detected in various ways. On the one hand, for each transport vehicle 1 the vehicle states "loaded" or "unloaded" can be stored in the management system 14 as parameters and can be considered accordingly. On the other hand, the transport vehicle 1 can be equipped with a suitable measuring device in order to be able to determine a precise load value. In this manner, different trajectories of different towing vehicles 1a and trailers 1b can be determined for different driving manoeuvres and boundary conditions because there are numerous variants and combinations of towing vehicles 1a and trailers 1b. Each different type of towing vehicle 1a and each different type of combination of towing vehicle 1a and trailer 1b can thus include a different trajectory for the same driving manoeuvre. The different previously determined trajectories can be stored in the management system 14 and/or the vehicle controller 13. For example, the following is then stored: the radii of curvature that a particular transport vehicle 1 or a particular towing vehicle 1 with a particular trailer 1b can travel over without any conflicts and without e.g. entering other lanes, and how steering must be effected such as in order to move forwards or rearwards and in a straight line or with turning movements and remaining within the specified lane. It is also feasible that in this regard the trajectory and/or the currently specified desired route of at least one other transport vehicle 1 is considered in order to avoid conflicts between the trajectories and/or the desired routes of a plurality of transport vehicles 1. With knowledge of and in consideration of the trajectories that are possible for a particular transport vehicle 1, an individual desired route can then be specified by the management system 14 for each transport vehicle 1 and can be transmitted to the vehicle controller 13, wherein the desired route corresponds to a trajectory that is possible for the transport vehicle 1. It is thereby ensured that only those desired routes that the respective transport vehicle 1 can follow along a possible trajectory without any conflicts are specified.

In order to be able to actuate the travel drive and the steering mechanism within automated operation of the transport vehicle 1 in a targeted manner, the actual state in terms of actual values of the position and orientation or alignment of the transport vehicle 1 also have to be fed back to the management system 14 and/or the vehicle controller 13. In this regard, the values of the articulation angle $\alpha 1$, steering angle $\alpha 2$ and rotational speed of the corresponding wheels 2, which values are determined by means of the sensors 15, 16 and 17, are evaluated by the vehicle controller 13 and/or the management system 14. Actual values of the position and orientation or alignment of the towing vehicle 1a can be determined such as by means of a locating system that uses transponder technology. In this manner, the position of the towing vehicle 1a can be calculated via one or two antennas attached to the towing vehicle 1a relative to two transponders attached to the ground 3. Other locating systems for determining the position and alignment of the towing vehicle 1a are feasible, such as D-GPS/Long Position Radar—LPR for short—wherein the towing vehicle 1a is provided with two antennas and distances relative to stationary LPR transponders used as location markers are measured in order to calculate therefrom the position and alignment/orientation. With knowledge of the position and orientation or alignment of the towing vehicle 1a and with knowledge of the determined articulation angle $\alpha 1$ and dimensions of the trailer 1b, the position and alignment of the trailer 1b and thus an actual value of the position and orientation/alignment of the overall transport vehicle 1 can then also be determined.

The vehicle controller 13 then may continuously compare the actual values of position and alignment of the transport vehicle 1 with the previously described consideration of actual values of the articulation angle $\alpha 1$ with the desired route specified in each case in consideration of a suitable trajectory. Deviations in this comparison are reduced by correspondingly actuating the steering mechanism and/or the travel drive in terms of controlling the steering mechanism and/or travel drive, in order for the transport vehicle 1 to follow the desired route with as little deviation as possible in terms of automated guidance. In terms of controlling the steering mechanism or the travel drive, any errors of the sensors should be considered because errors in this case have a large influence that can lead to a large deviation of the actual values from the desired route.

The above statements, in particular the consideration of a trajectory when specifying the desired route and consideration of the actual state, can also be transferred to manually guided transport vehicles 1. In this regard, in the case of the transport vehicles 1 being manually guided, the driver can receive driving instructions via a driver information system of the transport vehicle 1 and on the basis of the desired routes specified by the management system 14. The driving instructions are then converted into corresponding driving manoeuvres by the driver by manually engaging the vehicle controller 13. In this manner, the driving instructions can also be continuously adapted in consideration of and thus in dependence on the actual state, in particular if a driver has not followed the driving instructions based on a specified desired route or has not followed the instructions within a specifiable tolerance.

Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. A method for operating automated guided transport vehicles, each transport vehicle comprising a towing vehicle and a trailer having a loading surface for containers, the method comprising:
   determining a trajectory of one of the transport vehicles;
   specifying a desired route for the transport vehicle based on the trajectory;
   determining actual values of a position and orientation of the transport vehicle based at least partially on an articulation angle between the towing vehicle and the trailer;
   comparing the specified desired route with the actual values of the position and orientation of the transport vehicle;
   guiding the transport vehicle in an automated manner during forwards travel and also during rearwards travel;
   actuating a steering mechanism and a travel drive of the transport vehicle with a vehicle controller at the towing vehicle such that the transport vehicle follows the desired route;
   reducing a deviation of the actual values from the desired route by correspondingly actuating the steering mechanism and/or the travel drive;
   operating the steering mechanism to adjust a steering angle relative to an actual value of the articulation angle between the towing vehicle and the trailer; and
   determining different trajectories and specifying different desired routes for different ones of the transport vehicles.

2. The method as claimed in claim 1, wherein the trajectory is determined at least partially based on kinematic boundary conditions of the transport vehicle.

3. The system as claimed in claim 1, wherein said reducing a deviation of the actual values from the desired route comprises actuating the steering mechanism and/or the travel drive with the vehicle controller.

4. The system as claimed in claim 1, wherein said determining the actual values of the position and orientation of the transport vehicle comprises sensing the articulation angle between the towing vehicle and the trailer with a sensor coupled to the towing vehicle.

5. A system for operating automated guided transport vehicles for containers, the system comprising:
   a management system; and
   transport vehicles configured to be guided in an automated manner during forwards travel and also during rearwards travel;
   wherein each transport vehicle comprises a towing vehicle and a trailer having a loading surface for at least one container;
   wherein the towing vehicle comprises a vehicle controller for actuating, in an automated manner, a steering mechanism and a travel drive of the respective transport vehicle such that each respective transport vehicle follows a desired route;
   wherein the management system is configured and operable to:
      specify the desired route in consideration of a trajectory of the respective transport vehicle and to transmit the desired route to the vehicle controller, and wherein
      determine different trajectories and specify different desired routes for different transport vehicles;
      determine actual values of a position and orientation of each transport vehicle based at least partially on an actual value of an articulation angle between the towing vehicle and the trailer; and
      adjust a steering angle relative to the actual value of the articulation angle between the towing vehicle and the trailer;
   wherein the management system and the vehicle controllers are configured and operable to:
      actuate the steering mechanism and the travel drive of each transport vehicle such that each transport vehicle follows the desired route;
      compare the specified desired route of each transport vehicle with the actual values of a position and an orientation of each transport vehicle; and
      reduce a deviation of the actual values from the desired route by correspondingly actuating the steering mechanism or the travel drive.

6. The system as claimed in claim 5, wherein the loading surface is delimited by guide elements for guiding and aligning the at least one container to be placed on the loading surface.

7. The system as claimed in claim 5, wherein the trajectory of each transport vehicle is determined at least partially based on kinematic boundary conditions of each transport vehicle.

8. The method as claimed in claim 6, wherein said reducing a deviation of the actual values from the desired route comprises actuating the steering mechanism and/or the travel drive with the vehicle controller.

9. The method as claimed in claim 5, wherein said determining the actual values of the position and orientation of the transport vehicle comprises sensing the articulation angle between the towing vehicle and the trailer with a sensor.

* * * * *

UNITED STATES PATENT AND TRADEMARK OFFICE
CERTIFICATE OF CORRECTION

PATENT NO. : 11,269,359 B2
APPLICATION NO. : 16/611079
DATED : March 8, 2022
INVENTOR(S) : Armin Wieschemann et al.

It is certified that error appears in the above-identified patent and that said Letters Patent is hereby corrected as shown below:

In the Claims

Column 14,
Line 10, Claim 5, delete ", and wherein" after --controller--
Line 10, Claim 5, insert --;-- after --controller--

Signed and Sealed this
Thirty-first Day of May, 2022

Katherine Kelly Vidal
*Director of the United States Patent and Trademark Office*